(12) United States Patent
Wei et al.

(10) Patent No.: US 7,573,651 B2
(45) Date of Patent: Aug. 11, 2009

(54) LENS ADJUSTING MECHANISM CAPABLE OF TWO-DIMENSIONAL ADJUSTMENT

(75) Inventors: Hao-Chan Wei, Tainan County (TW); Tai-Chen Kuo, Tainan County (TW)

(73) Assignee: Chi Lin Technology Co., Ltd., Tainan County (TW)

( * ) Notice: Subject to any disclaimer, the term of this patent is extended or adjusted under 35 U.S.C. 154(b) by 0 days.

(21) Appl. No.: 12/000,369

(22) Filed: Dec. 12, 2007

(65) Prior Publication Data

US 2008/0252995 A1 Oct. 16, 2008

(30) Foreign Application Priority Data

Apr. 16, 2007 (CN) .......................... 2007 1 0090193

(51) Int. Cl.
  *G02B 15/14* (2006.01)
  *G02B 7/02* (2006.01)
(52) U.S. Cl. ...................................... 359/694; 359/813
(58) Field of Classification Search ................. 359/694, 359/813
  See application file for complete search history.

(56) References Cited

U.S. PATENT DOCUMENTS

| 6,113,240 A | * | 9/2000 | Iizuka ........................... 353/31 |
| 6,364,491 B1 | | 4/2002 | Okada et al. |
| 6,755,540 B1 | | 6/2004 | Runco |
| 7,090,360 B2 | | 8/2006 | Kuroda et al. |
| 2004/0017619 A1 | * | 1/2004 | Kang ........................... 359/822 |

* cited by examiner

*Primary Examiner*—Jordan M. Schwartz
*Assistant Examiner*—James C Jones
(74) *Attorney, Agent, or Firm*—Bacon & Thomas, PLLC

(57) ABSTRACT

A lens adjusting mechanism includes a fixed board, a movable board, two first sliding blocks, a first driving device and two second sliding blocks. The movable board is provided on the fixed board. The first sliding blocks, each of which has two first driving members connected to the first sliding blocks, are provided on the movable board for movement along an X axis. The first driving members drive the first sliding blocks moving along a Y axis together with the movable board. The second sliding blocks, each of which has two second driving members pivoted on the fixed board and connected to the second sliding blocks, are provided on the movable board for movement along the Y axis. The second driving members drive the second sliding blocks moving along the X axis together with the movable board.

7 Claims, 7 Drawing Sheets

LENS ADJUSTING MECHANISM CAPABLE OF TWO-DIMENSIONAL ADJUSTMENT

BACKGROUND OF THE INVENTION

1. Field of the Invention

The present invention relates generally to a lens of a projector, and more particularly to a lens adjusting mechanism capable of adjusting a lens of a projector along two directions.

2. Description of the Related Art

A conventional projector is equipped with an adjusting mechanism to adjust the image on the screen or the desired place when the projector is shifted or first set up. The conventional adjusting mechanism only adjusts the image along single direction. That is the lens is shifted up and down only but left and right. User has to move the whole projector to shift the image left and right.

U.S. Pat. No. 6,364,491 discloses a lens adjusting mechanism, which provides a knob to be turned for moving the lens up and down. In other words, this adjusting mechanism is as same as the above conventional device, which adjusts the lens along one direction only.

U.S. Pat. No. 6,755,540 and No. 7,090,360 disclose an adjusting mechanism, which provides two vertical rails and two horizontal rails for vertical and horizontal adjustments. These two patents provide a complex structure of the adjusting mechanism that each element has to be made individually with higher cost.

SUMMARY OF THE INVENTION

The primary objective of the present invention is to provide a lens adjusting mechanism, which adjusts the lens to any position of two dimensions fast to increase the convenience in operation.

The secondary objective of the present invention is to provide a lens adjusting mechanism, which has a simple structure that is easier for assembly to lower the cost of manufacture.

According to the objectives of the present invention, a lens adjusting mechanism includes a fixed board, a movable board, at least a first sliding block, a first driving device, at least a second sliding block and a second driving device. The movable board, which is provided on a lateral side of the fixed board, has at least a first fixing portion and at least a second fixing portion. The first sliding block is provided on the first fixing portion of the movable board for movement along an X axis. The first driving device has at least a first driving member pivoted on the fixed board and connected to the first sliding block. The first driving member drives the first sliding block moving along a Y axis to move the movable board relative to the fixed board along the Y axis. The second sliding block is provided on the second fixing portion of the movable board for movement along the Y axis. The second driving device has at least a second driving member pivoted on the fixed board and connected to the second sliding block. The second driving member drives the second sliding block moving along the X axis to move the movable board relative to the fixed board along the X axis. The first sliding block is restricted by the first fixing portion to move independent of the movable along the X axis.

In a preferred embodiment of the present invention, the first fixing portion of the movable board has a first slot parallel to the X axis. The first sliding block has a first lock portion to be engaged with the first slot. The second fixing portion of the movable board has a second slot parallel to the Y axis. The second sliding block has a second lock portion to be engaged with the second slot that the second sliding block may move in the second sliding slot along the Y axis.

With the lens adjusting mechanism of the present invention, the lens of the projector may be moved vertically and horizontally along the Y axis and the X axis to adjust the image to a desired position. The present invention has a simple structure and is easy to assembly that may achieve of the objective of lowering the cost of manufacture.

DETAILED DESCRIPTION OF THE INVENTION

Figure 1:
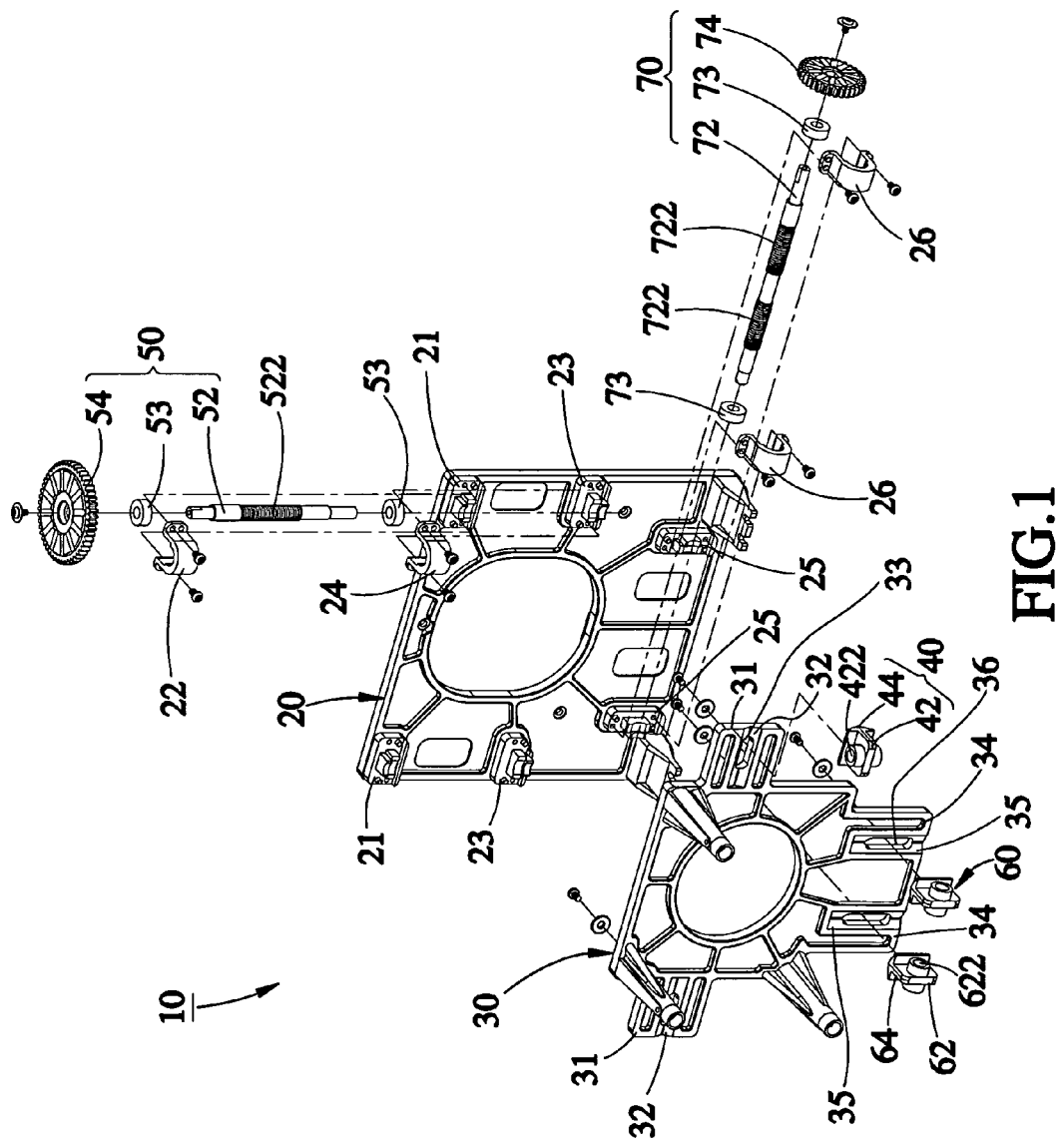
FIG. 1 is an exploded view of a first preferred embodiment of the present invention.

As shown in FIG. 1, a lens adjusting mechanism 10 of the first preferred embodiment of the present invention includes a fixed board 20, a movable board 30, a first sliding block 40, a first driving device 50, a second sliding block 60 and a second driving device 70.

Figure 2:
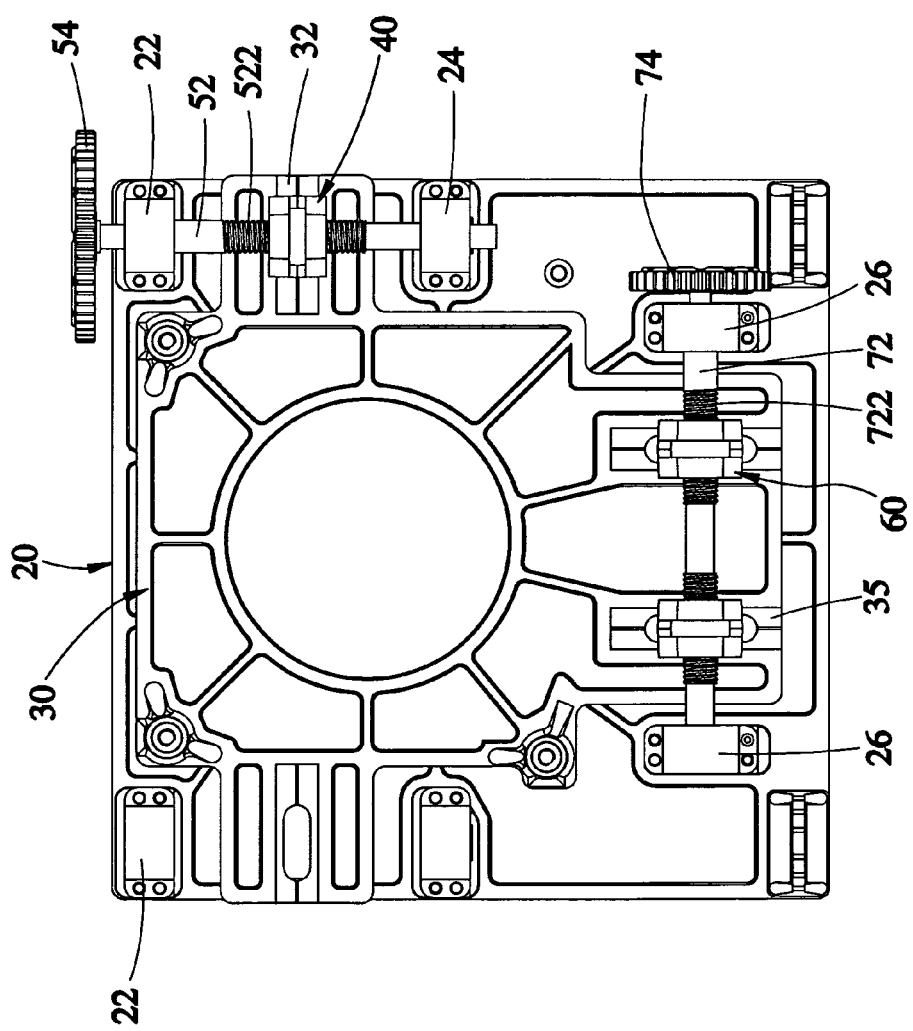
FIG. 2 is a front view of the first preferred embodiment of the present invention.

As shown in FIG. 2, the fixed board 20, which is fixed on a base of a projector (not shown), has two up support portions 21 at up sides of lateral sides thereof, on which a curved up support piece 22 is fixed respectively, two middle support portions 23, on which a curved middle support piece 24 is fixed respectively, under the up support portions 21 respectively, and two low support piece 25, on which a curved low support piece 26 is fixed respectively, under the middle support portions 23 respectively.

The movable board 30, which is provided on the lateral side of the fixed board 20, has two first fixing portions 31 at lateral sides thereof and between the up support portion 21 and the middle support portion 23 of the fixed board 20. Each of the first fixing portions 31 has a V-shaped first slot 32 along an X axis and a first bore 33 at a bottom of the first slot 32. The movable board 30 further has two second fixing portions 34 at a bottom thereof, each of which has a V-shaped second slot 35 and a second bore 36 at a bottom of the second slot 35.

The first sliding block 40 has a first body portion 42 and a first lock portion 44 connected to the first body portion 42. The first body portion 42 has a threaded hole 422. The first lock portions 44 of the first sliding blocks 40 are engaged with the first slots 32 respectively that the first blocks 40 may move left-and-right relative to the movable board 30 along the first slots 32 (the X axis).

The first driving device 50 includes a first driving member 52, two first bearings 53 and a first wheel 54. The first driving member 52, which has an axial direction parallel to a Y axis, has two threaded sections 522. The first driving member 52 passes one of the first up support pieces 22 and one of the middle support pieces 24 and is screwed into the first threaded holes 422 of the first sliding blocks 40 by the threaded sections 522. The first bearings 53 are fitted to a top end and a bottom end of the first driving member 52 and received in the first up support piece 22 and the middle support piece 24. The first wheel 54 is provided on the first driving member 52 that the first wheel 54 may rotate the first driving member 52.

Each of the second sliding blocks 60 has a second body portion 62 and a second lock portion 64 connected to the second body portion 62. The second body portion 62 has a threaded hole 622. The second lock portions 64 of the second sliding blocks 60 are engaged with the second slots 34 respectively that the second blocks 60 may move up-and-down relative to the movable board 30 along the second slot 34 (the Y axis).

The second driving device 70 includes a second driving member 72, two second bearings 73 and a second wheel 74. The second driving member 72, which has an axial direction parallel to the X axis, has two threaded sections 722. The second driving member 72 passes low support pieces 26 and is screwed into the second threaded hole 622 of the second sliding block 60 by the threaded sections 722. The second bearings 73 are fitted to a top end and a bottom end of the second driving member 72 and received in the second low support pieces 26. The second wheel 74 is provided on the second driving member 72 that the second wheel 74 may rotate the second driving member 72.

Figure 3:
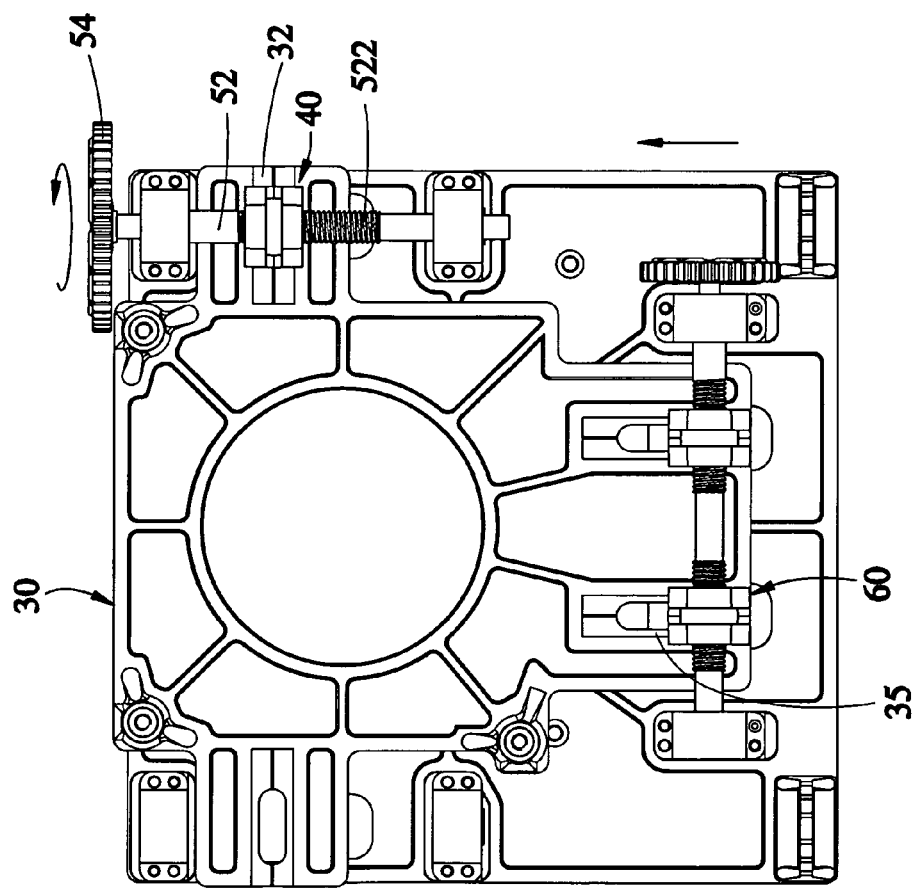
FIG. 3 is a front view of the first preferred embodiment of the present invention, showing the movable board moving upwards.

With the structure described above, when user wants to adjust the lens upward, he/she has to turn the first wheel 54 to turn the first driving member 52 that will move the first sliding blocks 40 upwards along the threaded sections 522 of the first driving member 52 (the Y axis). When the first sliding blocks 40 are moving upwards, the movable board 30 and the lens are moved upwards together, as shown in FIG. 3, and the second sliding blocks 60 are kept still and the movable board 30 is guided by the second sliding slots 34 and the second lock portions 64 of the second sliding blocks 60 to be moved upwards along the Y axis.

Figure 4:
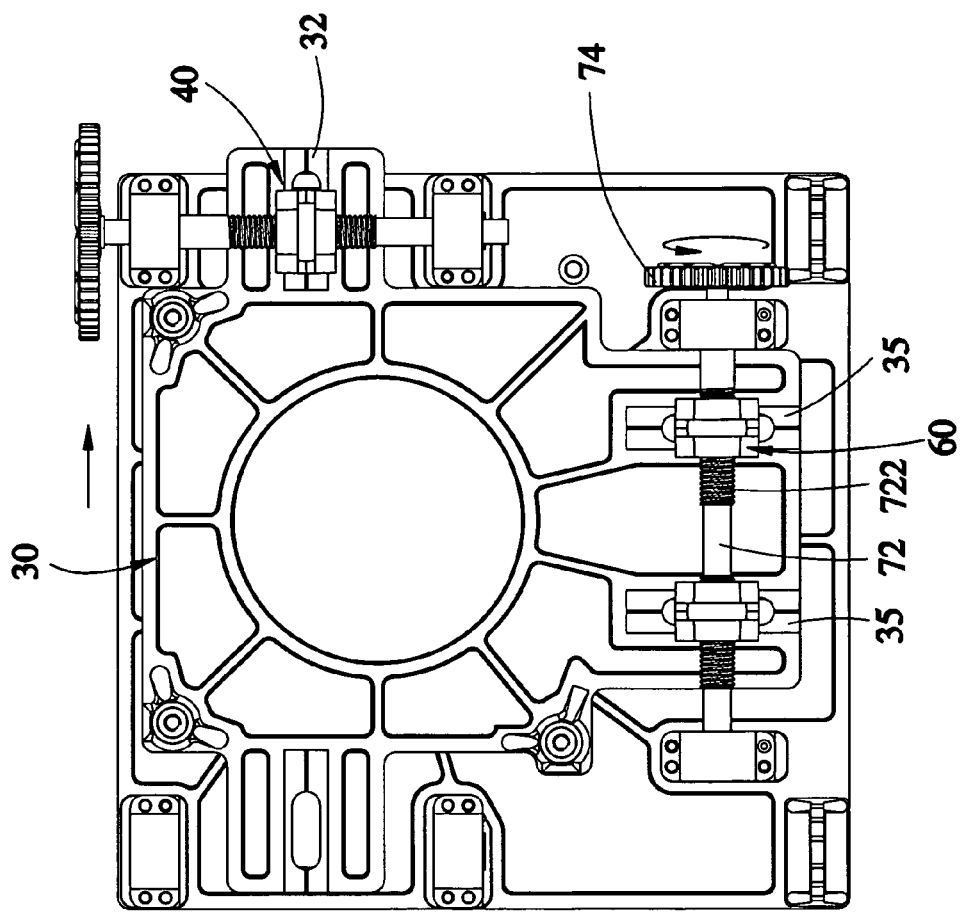
FIG. 4 is a front view of the first preferred embodiment of the present invention, showing the movable board moving to the right.

When user wants to adjust the lens of the projector to the right, he/she needs to turns the second wheel 74 to turn the second driving member 72 that will move the second sliding blocks 60 to the right along the threaded sections 722 of the second driving member 72 (the X axis). When the second sliding blocks 60 are moving to the right, the movable board 30 and the lens are moved to the right together, as shown in FIG. 4, and the first sliding blocks 40 are kept still and the movable board 30 is guided by the first sliding slots 32 and the first lock portions 44 of the first sliding blocks 40 to be moved to the right along the X axis. To adjust the lens downwards and leftwards will be the same processes as described above so we'll not describe them again.

Therefore, the lens adjusting mechanism of the present invention provides the first sliding blocks and the second sliding blocks to move the movable board horizontally or vertically (along the X axis and the Y axis) respectively for fast adjustment of the lens to the desired position that increases the convenience of operation and makes sure of the movable board moving parallel to the fixed board. In addition, the present invention has a simple structure that is easy for assembly and has a lower cost of manufacture.

Figure 5:
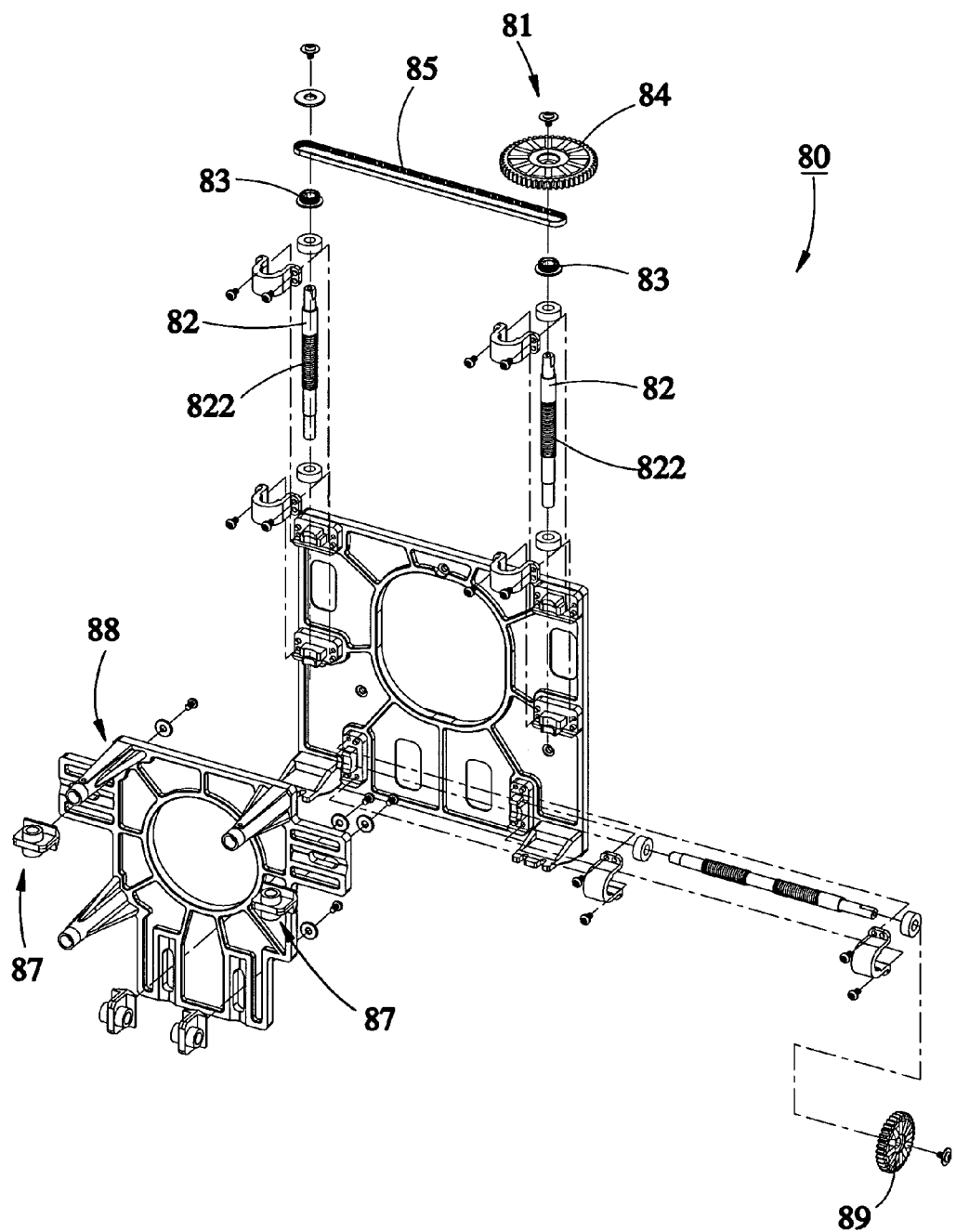
FIG. 5 is an exploded view of a second preferred embodiment of the present invention.

As shown in FIG. 5, a lens adjusting mechanism 80 of the second preferred embodiment of the present invention, which is similar to the first embodiment, except that:

A second driving device 81 includes two first driving members 82, two belt wheels 83, a first wheel 84 and a belt 85. The second embodiment further includes two first sliding blocks 87. Each of first driving members 82 has a threaded section 822 to connect the first sliding blocks 87. Each of the belt wheels 83 are mounted on tops of the first driving members 82 respectively. The first wheel 84 is mounted on one of the first driving members 82. The belt 85 is mounted to the belt wheels 83.

Figure 6:
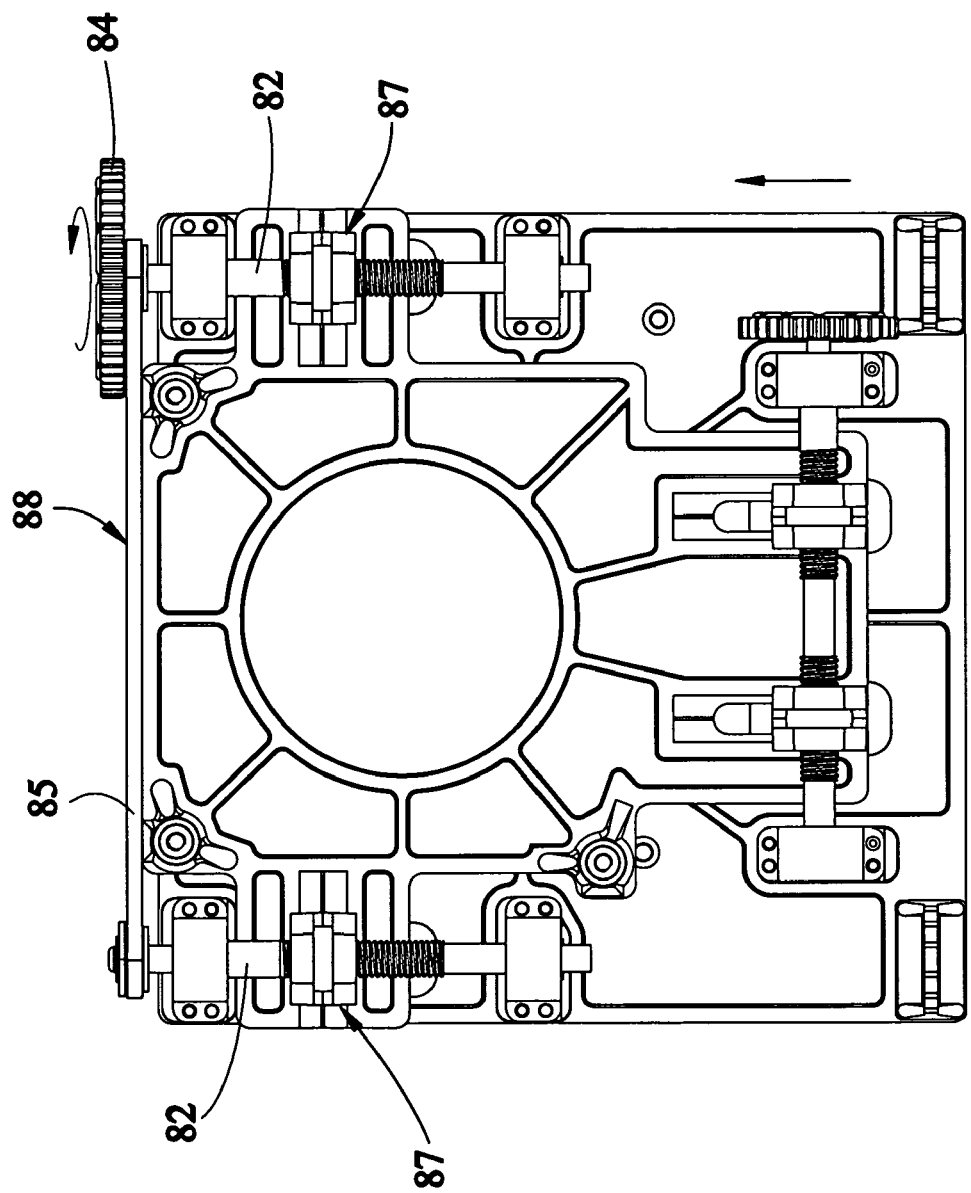
FIG. 6 is a top view of the second preferred embodiment of the present invention, showing the movable board moving upwards.

When the first wheel 84 is turned, as shown in FIG. 6, the first driving member 82 will rotate the belt wheel 83 and rotate the other belt wheel 83 through the belt 85 to move the first sliding blocks upwards along the Y axis that the movable board 88 and the lens are moved upward together. The situation of turning the second wheel 89 is as same as the first embodiment, so we'll not describe it again.

Figure 7:
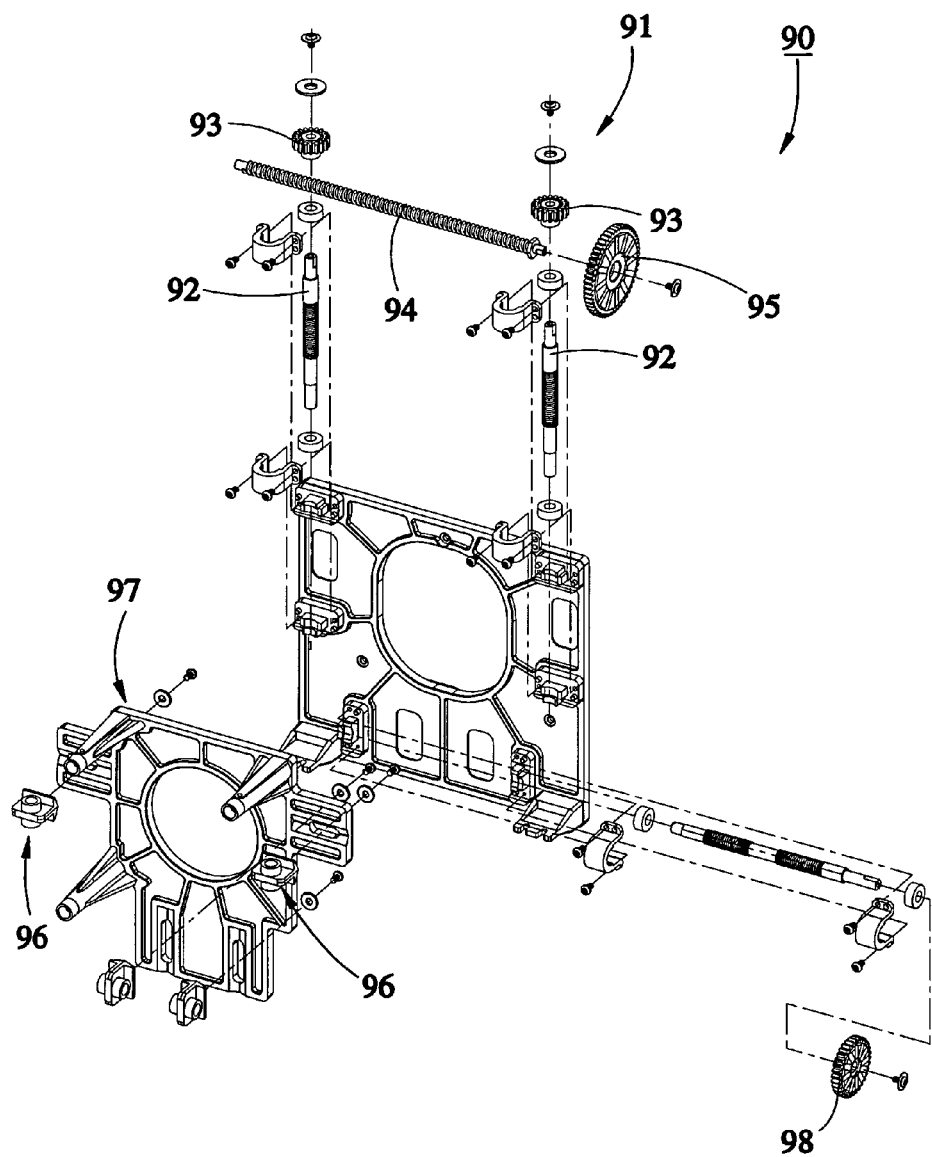
FIG. 7 is an exploded view of a third preferred embodiment of the present invention.

As shown in FIG. 7, a lens adjusting mechanism 90 of the third preferred embodiment of the present invention, which is similar to the first embodiment, except that:

A first driving device 91 includes two first driving members 92, two worm gears 93, a worm 94 and a first wheel 95. The first driving members 92 are connected to the first sliding blocks 96 as above, and the worm gears 93 are mounted on tops of the first driving members 92 to be meshed with the worm 94. The worm 94 is connected to one of the first driving members 92.

When the first wheel 95 is turned, the worm 94 is turned and drives the worm gears 93 turning. In this time, the worm gears 93 drive the first driving members 92 turning that the first driving members 92 moves upwards along the Y axis together with the movable board 97 and the lens. The situation of turning the second wheel 98 is as same as the first and second embodiments, so we'll not describe it again.

Therefore, the second and third embodiments provides different structures to achieve the same function of moving the lens along two directions that the projector equipped with the lens adjusting mechanism of the present invention may adjust the lens to the desired position fast to achieve the objective of the present invention.

The description above is a few preferred embodiments of the present invention and the equivalence of the present invention is still in the scope of the claim of the present invention.

What is claimed is:

1. A lens adjusting mechanism, comprising:
   a fixed board;
   a movable board, which is provided on a lateral side of the fixed board, having at least a first fixing portion and at least a second fixing portion;
   at least a first sliding block provided on the first fixing portion of the movable board for movement along an X axis;
   a first driving device having at least a first driving member pivoted on the fixed board and connected to the first sliding block, wherein the first driving member drives the first sliding block moving along a Y axis to move the movable board relative to the fixed board along the Y axis;
   at least a second sliding block provided on the second fixing portion of the movable board for movement along the Y axis; and
   a second driving device having at least a second driving member pivoted on the fixed board and connected to the second sliding block, wherein the second driving member drives the second sliding block moving along the X axis to move the movable board relative to the fixed board along the X axis.

2. The lens adjusting mechanism as defined in claim 1, wherein the first fixing portion of the movable board has a first slot parallel to the X axis, and the first sliding block has a first lock portion to be engaged with the first slot, and the second fixing portion of the movable board has a second slot parallel to the Y axis, and the second sliding block has a second lock portion to be engaged with the second slot.

3. The lens adjusting mechanism as defined in claim 2, wherein the first sliding block includes a first body portion, which is connected to the first lock portion, having a first threaded hole, and the first driving member has a threaded section to be screwed into the first threaded hole for connection of the first driving member and the first sliding block, and the second sliding block includes a second body portion, which is connected to the second lock portion, having a second threaded hole, and the second driving member has a threaded section to be screwed into the second threaded hole for connection of the second driving member and the second sliding block.

4. The lens adjusting mechanism as defined in claim 1, wherein the movable board has two of the first fixing portions, and there are two of the sliding blocks to be connected to the first fixing portions respectively for free movement, and the first driving device includes two of the first driving members, four first bearings, a first wheel, two first belt wheel and a belt, wherein the first driving members are connected to the first sliding blocks respectively that the first sliding blocks are driven by the first driving members respectively for movement along the Y axis, and the first bearings are fitted to opposite ends of the first driving members respectively, and the belt wheels are provided on the first driving members respectively, and the first wheel is provided on one of the first driving members, and the belt are mounted to the first belt wheels.

5. The lens adjusting mechanism as defined in claim 4, wherein the second driving device includes a second driving member, two second bearings and a second wheel, wherein the second driving member is connected to the second sliding block to move the second sliding block along the X direction, and the second bearings are fitted to opposite ends of the second driving member, and the second wheel is provided on the second driving member.

6. The lens adjusting mechanism as defined in claim 1, wherein the movable board has two of the first fixing portions, and there are two of the sliding blocks to be connected to the first fixing portions respectively for free movement, and the first driving device includes two of the first driving members, four first bearings, a two worm gear, a worm and a first wheel, wherein the first driving members are connected to the first sliding blocks respectively that the first sliding blocks are driven by the first driving members respectively for movement along the Y axis, and the first bearings are fitted to opposite ends of the first driving members respectively, and the worm gears are provided on the first driving members respectively to be meshed with the worm, and the first wheel is connected to the worm.

7. The lens adjusting mechanism as defined in claim 6, wherein the second driving device includes a second driving member, two second bearings and a second wheel, wherein the second driving member is connected to the second sliding block, and the second bearings are fitted to opposite ends of the second driving member, and the second wheel is provided on the second driving member.

* * * * *